Jan. 7, 1941.                S. M. TUCKER                 2,227,986
                         LANTERN SLIDE FRAME
                         Filed April 10, 1940
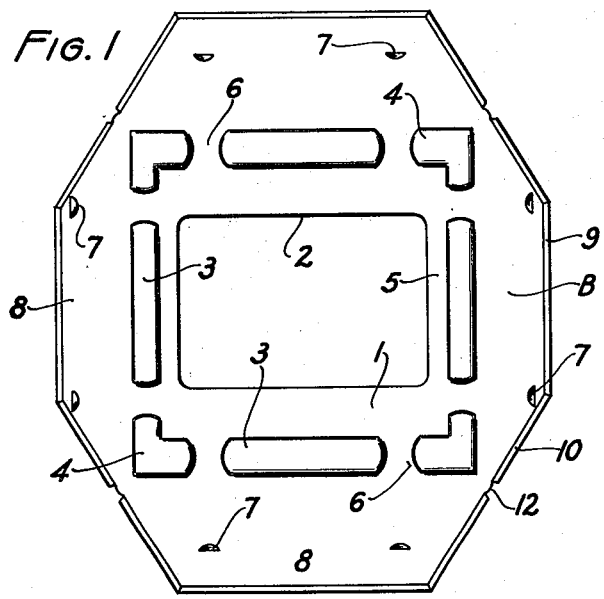
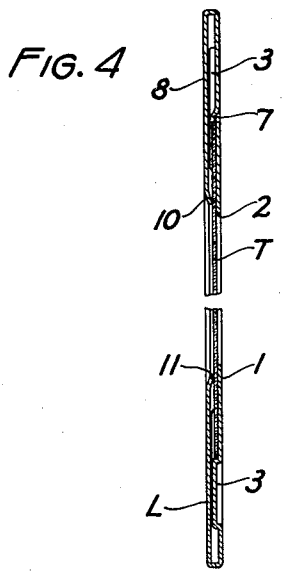
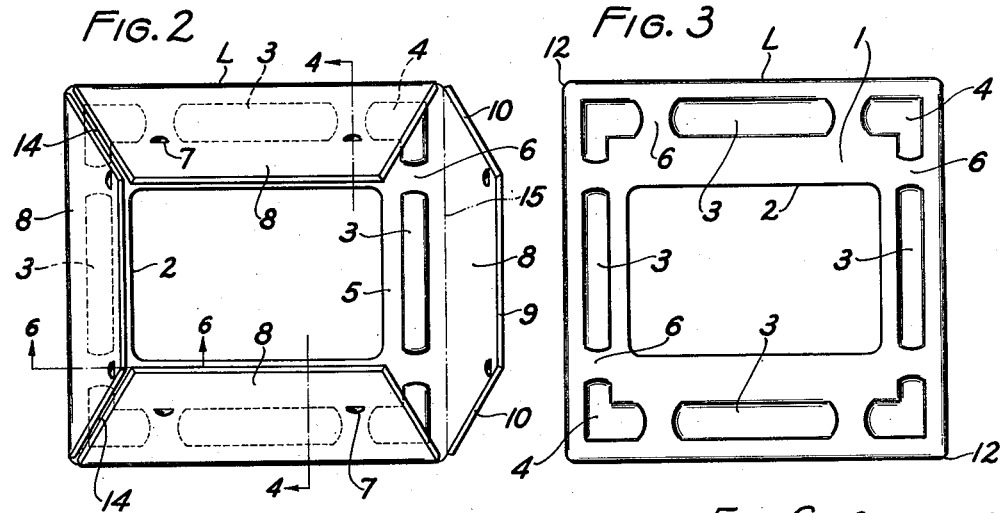
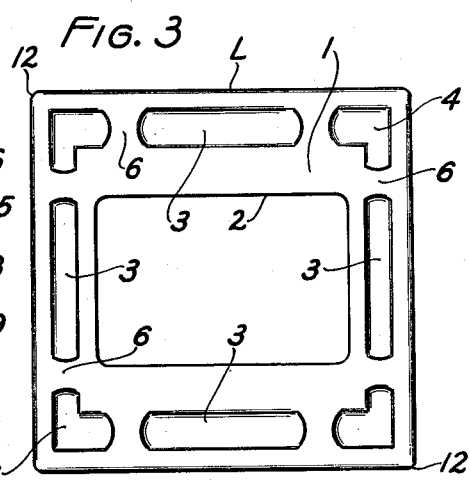
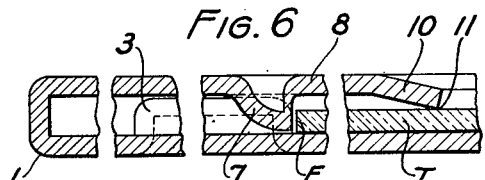
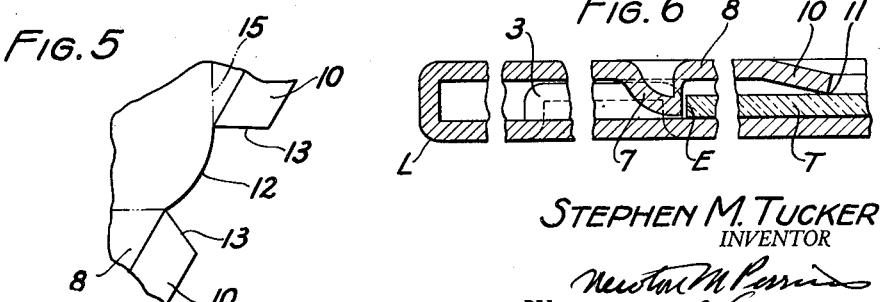
STEPHEN M. TUCKER
INVENTOR
BY
ATTORNEYS Patented Jan. 7, 1941

2,227,986

UNITED STATES PATENT OFFICE 2,227,986

LANTERN SLIDE FRAME

Stephen M. Tucker, Rochester, N. Y., assignor to Eastman Kodak Company, Rochester, N. Y., a corporation of New Jersey Application April 10, 1940, Serial No. 328,918

5 Claims. (Cl. 88—26)

This invention relates to lantern slide frames used for holding transparencies for viewing or projection. One of the objects of my invention is to provide a lantern slide frame made of a single piece of metal. Another object of my invention is to provide such a frame with a means for positioning a transparency and for permitting slight movement of the transparency while carried by the frame. Another object of my invention is to provide a frame of sheet metal in which all of the exposed edges will present a smooth outside contour without any projecting corners or edges which might damage the frame or injure a user. Another object of my invention is to provide a lantern slide frame in which the transparency is located by means of cooperating parts of the frame and in which one side of the transparency has only line contact with portions of the frame and still another object of my invention is to provide a frame one face of which is a flat wall with the opposite face a series of flaps each of which is so formed as to lie out of contact with the next adjacent flaps and other objects will appear from the following specification the novel features being particularly pointed out in the claims at the end thereof.

Most frames which have been designed for holding the transparency for projection and viewing have had the objection that they are comparatively expensive, not particularly durable and in many cases difficult to load. One of the difficulties with metal frames has been a tendency to overheat when placed in a projection beam, the heat from the metal frame being transferred to the transparency in cases where the transparency lies flat against the metal frame. Another difficulty has been that in order to make a lantern slide frame inexpensively from thin sheet metal it is difficult to eliminate the cut edges or to so place these edges that they will not project from the face of the lantern slide frame thus tending to catch on objects and bending the frame or even injuring the user. My improved lantern slide frame has been particularly designed to overcome these objections.

Coming now to the drawing wherein like reference characters denote like parts throughout, Fig. 1 is a plan view of a metal blank from which a lantern slide frame constructed in accordance with and embodying a preferred form of my invention can be made, Fig. 2 is a rear plan view of the blank shown in Fig. 1 partially folded to receive a transparency, Fig. 3 is a front plan view of a lantern slide frame completely folded from the blank shown in Fig. 1, Fig. 4 is an enlarged fragmentary sectional view on line 4—4 of Fig. 2, the thickness of the metal being exaggerated, Fig. 5 is a fragmentary detail plan view of one of the corners of the blank from which a frame may be folded, and Fig. 6 is a greatly enlarged sectional detail taken on line 6—6 with the scale exaggerated to show the relationship of the transparency locating formings.

Fig. 1 shows a blank B shaped in accordance with a preferred form of my invention so that it can be folded to form a lantern slide holder designated broadly as L having a pair of facing walls.

The wall 1, which may be called the front wall, is provided with a cut-out 2 of a size to frame the transparency and there are a plurality of embossed areas 3 opposite each side of the cut-out and embossed areas 4 opposite the corners of the cut-out, for the purpose of forming a locating frame or seat 5 for locating a transparency. In addition, these formings materially strengthen the face 2 of the lantern slide frame. It should be noticed that there are areas 6 between the various formings of a substantial size, these areas being to receive a plurality of much smaller formings 7 carried by the flaps 8 which are folded over from the edges of the blank B to form the rear face of the frame. Thus, when the frame has been completely folded, as indicated in Figs. 3 and 6, the embossings 3 and 4 rest against the inner face of the flaps 8 and the embossings 7 rest against or come close to the inner face of the front wall 1 so that, as shown in Fig. 6, these sets of embossings form locating members against which an edge E of a transparency T may rest or may be located.

Since one of the difficulties with flexible thin transparencies is that they may warp if tightly held to expansion and contraction in the presence of heat, I prefer to locate the embossings 3, 4 and 7 in such relationship that a small degree of movement is permitted because these embossings are spaced apart a distance somewhat greater than the outer dimensions of the transparency. Thus when a transparency is laid in the lantern slide frame L the transparency should be capable of moving a short distance between these cooperating embossings.

It is desirable to have at least one wall of the lantern slide frame L spaced at least slightly away from the face of the transparency because this tends to reduce the heat conducted from the frame by the film. To accomplish this, the flaps 8 are provided with a body or periphery formed of the diagonal walls 9 and 10 which are formed slightly inwardly as shown in Figs. 4 and 6 so that these walls have only a line contact at 11 with the transparency T. The advantage in this construction is not only that the transparency is spaced slightly from the face of the lantern slide frame L formed by the tabs 8 but it makes it a relatively simple matter in loading the frame by means of an automatic machine or by hand to bend down the flaps 8 to form the line contact without a great deal of pressure or care being required.

Moreover the downwardly formed flanges 11 position the shorter edges of the flaps 8 somewhat below the outer plane of the lantern slide face formed by the flaps 8 and consequently if there should be sharp edges these edges are so positioned that they will not injure an operator or that they will not catch on clothing and the like.

One of the difficult parts of a lantern slide metal frame shaped to avoid sharp corners is the corner of the frame. As will be noticed from Fig. 5, I prefer to form this corner in the form of a smooth curve 12 which is blanked out in such a manner that the edges 13 of the inwardly formed edges 10 of the flaps 8 are spaced a material distance away. This has a number of advantages; first, when the frame is completely folded there is a space 14 between the edges of the flap members 8 so that when these are formed over slight inaccuracies in size will not cause these flanges to engage, overlap or bind one against the other. Still more important, this space provides ample room for the downwardly turned edges 9 and 10 so that they will lie beneath the outer plane of the flaps 8 and clearance is also provided so that rounded edge 12 will lie in the plane of the front face 1 of the lantern slide frame L and will provide a smooth and rounded contour thus avoiding sharp corners.

While obviously the frame may be made of any suitable material, I prefer to construct it of aluminum sheeting .010 inch in thickness because such a lantern slide frame will be sufficiently rigid when embossed and folded to maintain its shape and yet the frame will remain light in weight. Moreover polished aluminum reflects a great deal of the heat and consequently less heat is absorbed by the transparency this being particularly true because the transparency is, as above described, spaced from the flaps 8 except where these flaps have line contact with the transparency due to the downwardly formed edge portions 9 and 10.

These lantern slide masks may be loaded into a machine by feeding the blanks B into a machine which will drop a transparency in place between the embossings 3 and 4 and which will then fold over all four flaps 8 so that the transparency may be quickly and readily fastened in the lantern slide frame L. In some instances it may be desirable to have the lantern slide frames L loaded by hand in which case one flap 8 may be left unfolded as indicated in Fig. 2 so that the operator may fold the flap along the line 15 either by hand or with a hand press to confine the transparency in the seat 5. Regardless of how the flaps 8 are folded, it should be noticed that the transparency is always framed by the cut-out 2 and that the edges of the flaps 8, which are turned inwardly, hold the transparency close against the cut-out 2 around the edges thereof, these edges being spaced apart a distance slightly greater than the dimensions of the cut-out 2. Since the transparency T is of somewhat smaller outside dimensions than the inner edges of the embossings 3, 4 and 7, when subjected to heat for a considerable length of time, some movement of the transparency T in its own plane is permitted. The flanges 8 are not bent down with appreciable force against the transparency T because of the embossings 3 and 4 which necessarily space the flaps a known distance from the relatively flat face 1 of the lantern slide holder. Thus, the pressure exerted by the downwardly turned edges 9 and 10 of the flaps is insufficient to prevent the transparency T from moving.

These lantern slide holders are designed primarily for use with transparencies T which may be on a flexible cellulosic base and which may be used without glass although varnished if desired to protect the surfaces of the transparency. With a lantern slide frame L as above described, it is a simple matter for an operator to remove a transparency by hand since one or more of the flaps 8 may be bent up to permit its removal. While it is possible to use one of these frames for a number of different transparencies, it is not usually desirable to bend the flaps 8 back and forth a number of times because the metal may become brittle and break. However, since the metal is preferably quite thin, it is possible often to bend these flaps a number of times without injury to the frame.

It should be noticed from Fig. 6 that the small embossings 7 project down into overlapping relationship with embossings 3 and 4 so that it is impossible for the transparency T (which is actually quite thin) to slide between an embossing and a face of the frame and thus move out of its intended seat 5. While holding the transparency T loosely, it nevertheless confines it to the proper location with reference to cut-out 2 which forms the frame. Moreover the larger formings 3 and 4 limit the folding movement of the flaps 8 toward the front face 1 of the frame and prevent the edges 11 from penetrating into the surface of the transparency T during the mounting operation.

Having thus described my invention, what I claim and desire to be secured by Letters Patent of the United States is:

1. A lantern slide frame comprising a single piece of thin metal and bent to form a double walled frame for holding a transparency of considerably smaller size than the outside of the frame, one frame face including a normally flat wall with a plurality of embossings spaced about a central aperture and positioned in spaced relation to the aperture whereby, the walls of the embossings nearest the aperture define margin guides for the transparency of smaller size than the outside of the frame, the embossings of at least one side being separated from each other leaving unembossed areas of material width, the opposite face of the frame consisting of four flaps bent toward the central aperture and spaced from the opposite frame face by a distance at least as great as the depth of the embossings, and a plurality of small embossings in the flaps of less width than the unembossed areas separating the embossings and positioned to project into the unembossed areas between the embossings on the opposite face of the frame whereby the two sets of embossings may overlap and may confine the transparency to a predetermined position by the edge walls of the embossings in the face of the frame and the edge walls of the embossings in the flaps forming the opposite face of the frame.

2. A lantern slide frame comprising a single piece of thin metal and bent to form a double walled frame for holding a transparency of considerably smaller size than the outside of the frame, one frame face including a normally flat wall with a plurality of embossings spaced about a central aperture and positioned in spaced relation to the aperture whereby, the walls of the embossings nearest the aperture define margin guides for the transparency of smaller size than the outside of the frame, the embossings of at least one side being separated from each other leaving unembossed areas of material width, the opposite face of the frame consisting of four flaps bent toward the central aperture and spaced from the opposite frame face by a distance at least as great as the depth of the embossings, and a plurality of small embossings in the flaps of less width than the unembossed areas separating the embossings and positioned to project into the unembossed areas between the embossings on the opposite face of the frame and into an overlapping relationship therewith to define a seat for the transparency and means including inwardly formed flanges on the edges of the flaps defining the second face of the frame for holding the transparency against the first mentioned face of the frame and for spacing the major part of the transparency from the flaps.

3. A lantern slide frame comprising a single piece of thin metal and bent to form a double walled frame for holding a transparency, one frame face including a normally flat wall with a plurality of embossings spaced about a central aperture, the walls of the embossings nearest the aperture defining margin guides for a transparency of known size, the embossings being separated from each other a material distance, the opposite face of the frame consisting of four flaps bent toward the central aperture and spaced from the opposite frame face by a distance at least as great as the depth of the embossings, and a plurality of small embossings in the flaps projecting into the spaces between the embossings on the opposite face of the frame and into an overlapping relationship therewith to define a seat for a transparency and means including inwardly formed flanges on the edges of the flaps defining the second face of the frame for holding the transparency against the first mentioned face of the frame and for spacing the major part of the transparency from the flaps, entire periphery of the flaps having contact with the transparency whereby said flaps may have only a line of contact with said transparency tending to hold said transparency flat against the first mentioned face of the frame and permitting movement thereof, when subjected to heat.

4. A lantern slide frame comprising a single piece of thin metal and bent to form a double walled frame for holding a transparency, one frame face including a normally flat wall with a plurality of embossings spaced about a central aperture the length of all the embossings being not greater than the length of the aperture and the embossings along at least two sides of the aperture being much shorter than the sides of the aperture and including unembossed spaces between the separated embossings, the walls of the embossings nearest the aperture defining margin guides for a transparency of known size, the opposite face of the frame consisting of four flaps bent toward the central aperture and spaced from the opposite frame face by a distance at least as great as the depth of the embossings, and a plurality of small embossings in the flaps projecting into the unembossed spaces between the embossings on the opposite face of the frame, and a smoothed curved flat wall at each corner of the frame between each of the flaps whereby the flap edges are spaced at the corners.

5. A lantern slide frame comprising a single piece of thin metal and bent to form a double walled frame for holding a transparency, one frame face including a normally flat wall with a plurality of embossings spaced about a central aperture, the walls of the embossings nearest the aperture defining margin guides for a transparency of known size, the embossings being separated from each other a material distance, the opposite face of the frame consisting of four flaps bent toward the central aperture and spaced from the opposite frame face by a distance at least as great as the depth of the embossings, and a plurality of small embossings in the flaps projecting into the spaces between the embossings on the opposite face of the frame, a smooth curved flat wall at each corner of the frame between each of the flaps whereby the flap edges are spaced at the corners, and downwardly turned edges extending from the curved corner walls completely around the outer edges of the flaps whereby the flaps may be spaced from a transparency held by the frame and the edges of the flaps may lie in an unexposed position presenting smooth exterior walls on the holder.

STEPHEN M. TUCKER.